April 23, 1940.　　　F. E. GRAHAM　　　2,198,383
DISPENSING DEVICE
Filed July 28, 1938　　　2 Sheets-Sheet 1
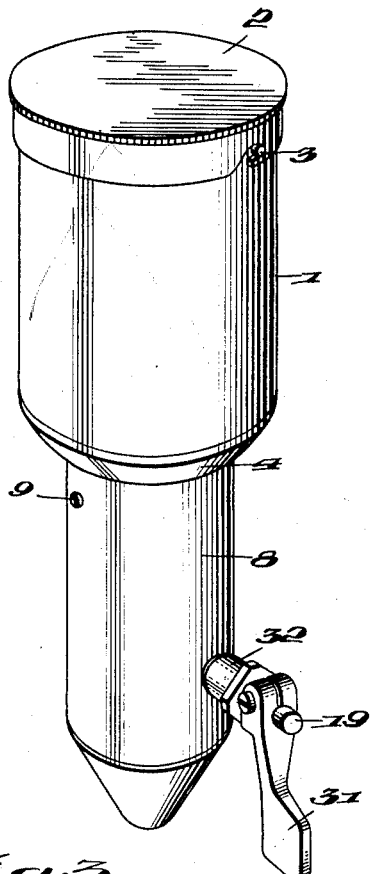
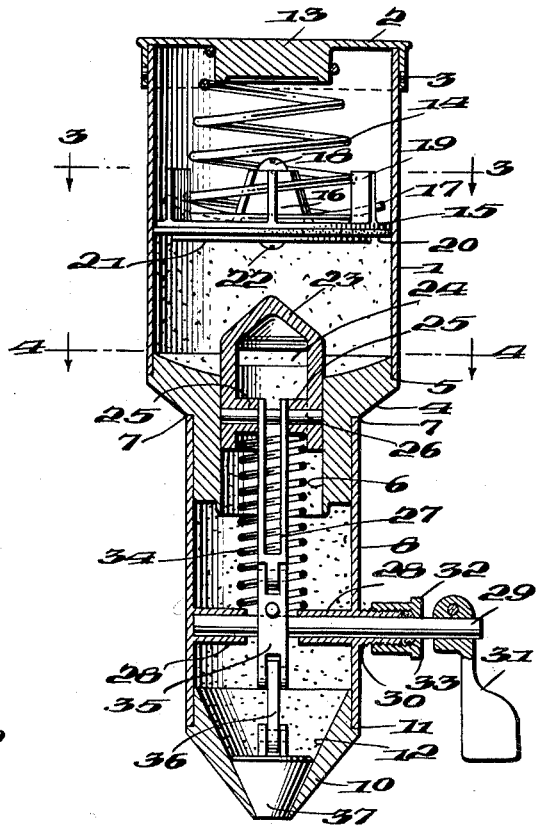
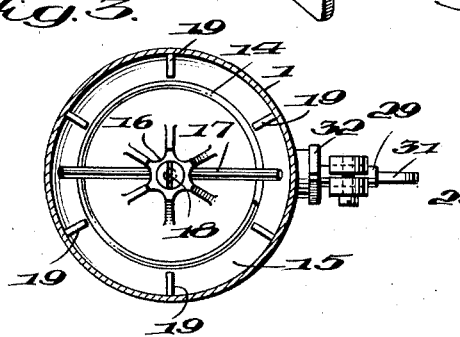
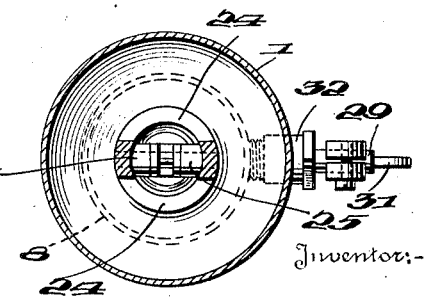
Inventor:-
Floyd E. Graham,
By Smith, Michael & Gardiner,
Attorneys.

April 23, 1940.                F. E. GRAHAM                2,198,383
                              DISPENSING DEVICE
                            Filed July 28, 1938            2 Sheets-Sheet 2
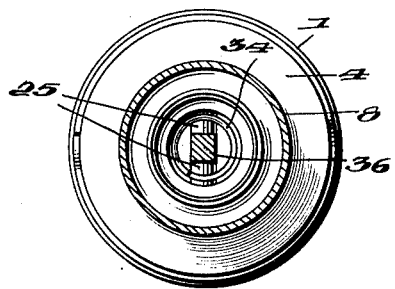
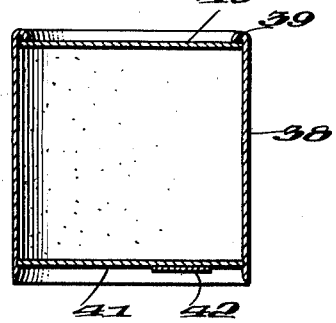
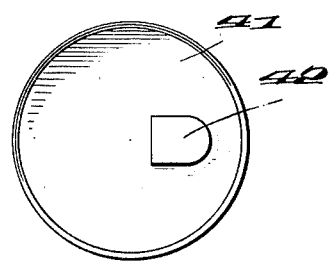
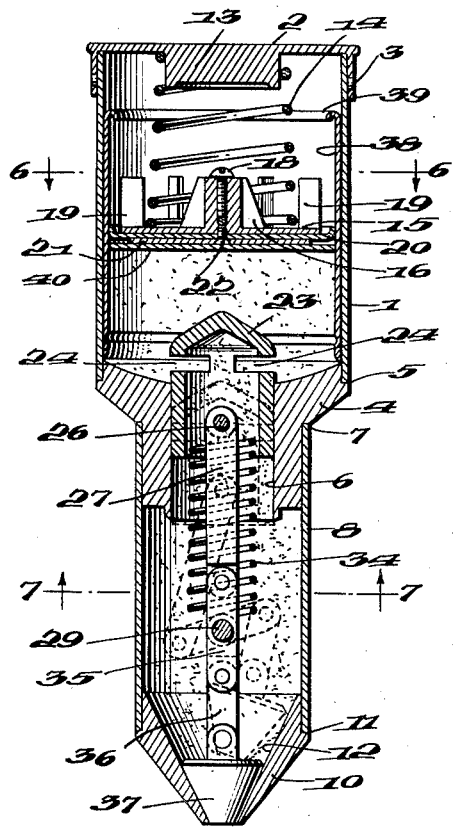
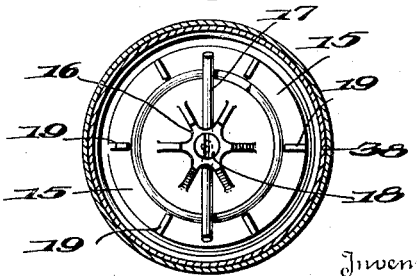
Inventor:
Floyd E. Graham,
By Smith, Michael & Gardiner,
                              Attorneys.

UNITED STATES PATENT OFFICE 2,198,383

DISPENSING DEVICE

Floyd E. Graham, Akron, Ohio

Application July 28, 1938, Serial No. 221,824

11 Claims. (Cl. 221—102)

My invention relates to a dispensing device and has particular reference to a device for dispensing plastic or viscous materials, such as soap, tooth paste, cold cream, grease or the like.

It is an object of my invention to provide a dispensing device which may be attached to a wall or similar supporting surface or bracket, and by means of which an amount of plastic or viscous material may be dispensed as desired.

It is an object of my invention to provide a dispensing device including a dispensing chamber into which a plastic or viscous material may be forced and to provide such chamber with an inlet valve and with an outlet valve simultaneously operable by means of a suitable handle.

It is a further object of my invention to provide a dispensing device including a dispensing chamber into which a plastic or viscous material may be forced, and to provide an outlet valve at one end of said chamber and an inlet valve at the other end of said chamber, which inlet valve functions as a piston or plunger during portions of its cycle of operation and thus serves to force the plastic or viscous material from the dispensing chamber and through the outlet valve thereof.

It is a further object of my invention to provide a dispensing device including a supply chamber or reservoir for the storage of a supply of the plastic or viscous material and to associate with said chamber or reservoir a pressure device for forcing the material from said chamber or reservoir and into a second or dispensing chamber, and to provide a pair of simultaneously operable valves, one controlling the passage between the two chambers and the other controlling the outlet from said second chamber, the construction being such that the valve between the two chambers also functions as a piston or plunger to forcibly eject the material from the second chamber and through the outlet valve thereof.

It is a further object of my invention to provide a package or cartridge for insertion within the supply chamber or reservoir of a dispensing device of the above mentioned character, which package has a sliding top or closure actuated by the pressure device of said chamber and which top or closure functions as a piston or follower for forcibly ejecting the contents of the package into the dispensing chamber.

It is a still further object of my invention to provide a dispensing device of the above mentioned character that is simple in construction and operation, cheap and easy to manufacture, strong and durable, and highly efficient in the purposes for which designed.

In the accompanying drawings, wherein I have shown several preferred embodiments of my present invention, Figure 1 is a perspective side elevation of the improved dispensing device of this application, Fig. 2 is a vertical sectional view of the dispensing device shown in Fig. 1, Fig. 3 is a transverse sectional view on the line 3—3 of Fig. 2, Fig. 4 is a transverse sectional view on the line 4—4 of Fig. 2, Fig. 5 is a vertical sectional view of a slightly modified form of my invention showing a package or "cartridge" positioned within the supply chamber or reservoir, Fig. 6 is a transverse sectional view on the line 6—6 of Fig. 5, Fig. 7 is a transverse sectional view on the line 7—7 of Fig. 5, Fig. 8 is a vertical sectional view of a package or "cartridge" adapted for use with that form of my invention shown in Fig. 5, and Fig. 9 is an inverted plan view showing the bottom of the package or "cartridge" shown in Fig. 8.

In the accompanying drawings forming a part of this specification and wherein like reference numerals have been employed to designate like parts throughout the several views, the numeral 1 designates a cylindrical supply chamber or reservoir, the upper open end of which is normally closed by a top or cover 2 removably attached to said chamber by a pin and bayonet slot connection 3. The lower end of the cylindrical supply chamber is rigidly attached to a member 4 shouldered, as at 5, to receive the said lower end of said chamber, the member 4 having an axially-extending, cylindrical bore 6, and being reduced and shouldered as at 7, to slidably engage the upper, open end of a cylindrical dispensing chamber 8 which is attached to the reduced portion of the member 4 by any suitable means, for example, the screw 9. The lower, open end of the chamber 8 has inserted and retained therein a plug 10 reduced and shouldered, as at 11, to snugly fit within said chamber 8, the plug 10 having a downwardly tapered, conical bore 12. It will thus be seen that the parts above described provide a supply chamber or reservoir 1 communicating at its lower end through the bore 6 with the upper end of the dispensing chamber 8, which chamber 8 is provided with an outlet opening at the lower end thereof.

The removable top or cover 2 is provided on its inner surface with a cylindrical lug 13 which fits tightly within the uppermost convolutions of a coiled, compression spring 14, the lowermost convolutions of which are attached to a piston or plunger 15. As a convenient and satisfactory means for attaching the spring 14 to the piston 15, I provide a centrally-located upstanding lug 16, having near the base thereof a transverse passage through which may be inserted a pin 17 of a length slightly less than the diameter of the piston 15 but slightly greater than the diameter of the lowermost convolution of the spring 14. The upstanding lug 16 is provided with an axially extending, internally-threaded bore which intersects the transverse passage above referred to and which is adapted to receive a clamping screw 18. It is intended that the top or cover 2, the spring 14, and piston 15 be connected so that the said spring and piston will be secured to said top and will be removable therewith. To this end, the uppermost convolutions of the spring are frictionally engaged within, or otherwise attached to, the lug 13, and the lowermost convolution of the said spring is placed in contact with the upper surface of the piston 15, the pin 17 is passed through the transverse passage at the base of the lug 16 with opposite end portions of said pin overlying diametrically opposite portions of said lowermost convolution of said spring, and the screw 18 is screwed down to contact with and rigidly clamp the pin 17 in position. The piston 15 is provided on its upper surface with a plurality of upstanding lugs 19 the outer edges of which are adapted to engage the inner surface of the cylindrical chamber 1 to prevent tilting or rocking of said piston within said chamber. The underside of the piston 15 has secured thereto a packing disk 20 of leather or the like, which disk is clamped between the underside of said piston and a clamping disk 21 attached to said piston by a screw 22, it being understood that the diameter of the disk 20 is substantially equal to or slightly greater than the internal diameter of the chamber 1, and that when the cover 2 and its associated spring and piston are assembled within the chamber 1, the spring 14 constantly urges the piston 15 toward the lower end of the chamber 1, the lugs 19, because of their extended engagement with the inner surface of said chamber, preventing tilting or rocking movement of said piston within said chamber.

As a means for controlling the passage of the plastic or viscous material from the supply chamber or reservoir 1 into the chamber 8, I position a combined valve and plunger 23 within the bore 6 of the member 4, this valve and plunger having a tight, sliding fit within said bore. The member 23 is hollow and is provided near the closed upper end thereof with one or more arcuate slots 24 through which material may pass from the chamber 1 and into the chamber 8 when the member 23 is in its uppermost position shown in Fig. 2 of the accompanying drawings. Near the lower end of the member 23 is a pair of diametrically-opposed, inwardly extending lugs 25 apertured to receive a pin 26 which constitutes a wrist pin for a connecting rod or link 27. The chamber 8 is provided with a pair of diametrically-opposed, inwardly extending lugs 28 apertured to receive a shaft 29, one end of which extends outwardly through a lug 30 on the outside of the chamber 8, and which shaft has rigidly secured to the outer end thereof an operating handle 31, it being obvious that rotation of the handle 31 will cause a corresponding rotation of the shaft 29. The lug 30 is externally threaded to receive a packing nut 32 by means of which packing 33 is compressed tightly about the shaft 29 to constitute a leak-proof joint.

Interposed between the underside of the lugs 25 and the upperside of the lugs 28 and surrounding the link 27 is a coiled expansion spring 34 which functions to normally maintain the member 23 in its uppermost position shown in Fig. 2 of the accompanying drawings. Keyed to the shaft 29 between the adjacent inner ends of the lugs 28, is a link 35 having one end pivotally attached to the lower end of the link 27 and having its opposite end pivotally attached to one end of a third link 36, the opposite end of which is pivotally attached to a conical outlet valve 37, the links 27, 35 and 36 being so proportioned that their combined length, when said links are in alinement, will retain the member 23 in its uppermost position and the valve 37 in its fully closed position, all as shown in Fig. 2.

Referring to the operation of that form of my invention above described, the supply chamber or reservoir 1 is filled with the plastic or viscous material to be dispensed, the piston 15 is placed above the mass of material within said chamber, and the top or cover 2 is forced down and attached to the chamber 1 by means of the pin and bayonet slot connection 3, it being understood that when thus assembled, the spring 14 will be materially compressed. Assuming that the parts occupy the positions shown in Fig. 2, the spring 14 will cause the piston 15 to move downwardly within the chamber 1 and will force the plastic or viscous material through the arcuate slots 24 and into the dispensing chamber 8 to completely fill said chamber 8. When it is desired to dispense the plastic or viscous material from the device, the operator moves the handle 31 in a clockwise or counter-clockwise direction. This movement of the handle 31 causes a corresponding rotation of the shaft 29 and of the link 35 keyed thereon, which causes the link 27 to pull the member 23 downwardly and to pull the valve 37 upwardly. As the member 23 moves downwardly, the arcuate slots or openings 24 are closed by the surrounding walls defining the axial bore 6 and continued downward movement of said member causes the said member to function as a piston or plunger to force some of the material from the dispensing chamber 8 through the outlet opening at the bottom of said chamber, it being understood that as the member 23 moves down the valve 37 is simultaneously lifted off its seat, thus permitting the material to be forced through the opening at the bottom of the dispensing chamber 8. It will be apparent that the amount of material discharged from the chamber 8 is directly dependent upon the extent of movement of the handle 31, as such movement directly controls the extent of movement of the member 23. Attention is directed to the dotted line disclosure in Fig. 5 of the accompanying drawings wherein there is shown the position of the member 23, links 27, 35 and 36 and valve 37, when the handle 31 has been moved to its maximum extent. If sufficient material has been dispensed by the single operation of the handle and its associated parts, the handle is released and the spring 34 forces the member 23 to its uppermost position as shown in Fig. 2, straightens out the links 27, 35 and 36 as shown in Fig. 5, and positively forces the valve 37 to its fully closed position. Just as soon as the arcuate slots or openings 24 pass above the upper edge of the walls defining the axial bore 6, the piston 15 forces additional material through the said slots or openings to replace the material discharged from the dispensing chamber 8 and to completely fill said chamber preparatory to the next dispensing operation.

In the modified form of my invention shown in Figs. 5, 6 and 7, the construction is substantially the same as that above described in connection with the preferred embodiment of my invention shown in Figs. 1 to 4 inclusive, the only difference being in the construction of the piston 15 and its associated parts, which difference is necessitated because of the use, in this modified form of my invention, of a package or "cartridge" for containing the plastic or viscous material to be dispensed. For use with this slightly modified form of my invention, I provide a cylindrical package or "cartridge" 38 constructed of paper, cardboard, sheet metal or the like, cylindrical in transverse cross section, and having an external diameter corresponding to the internal diameter of the supply chamber or reservoir 1 so that said package may be inserted within the said chamber with a relatively tight sliding fit. The upper edge of the package or "cartridge" 38 is flanged inwardly as indicated by the reference numeral 39 and the top of said package or "cartridge" is closed by a disk 40 which has a diameter substantially equal to the internal diameter of said package. The bottom of said package 38 is closed by a removable disk closure 41 which snaps within a groove formed in the inner wall of the package and which may be removed from the said package by means of a pull-tab 42. During the steps of assembling and filling the package, the top 40 is passed through the lower, open end of the package and is moved upwardly until it contacts with the inturned flange 39. The plastic or viscous material is then packed into the package until the same is completely filled, and the removable disk closure 41 is then snapped into place, thus providing a simple merchandizable "refill" container or package.

When it is desired to use one of the packages or "cartridges" above described, in a dispensing device of the form shown in Figs. 5, 6 and 7, the bottom 41 is removed from the package and the package is inserted within the supply chamber or reservoir 1 with the top 40 of the package uppermost. The piston 15 of this form of my invention is of a diameter slightly less than the internal diameter of the package 38 so that said piston may pass into the package through the flanged, upper end thereof, and while the upstanding lugs 19 on said piston do not directly engage the inner wall of the package 38, their presence will obviously prevent any appreciable rocking or tilting of the piston 15 and its associated parts. When the package is inserted within the chamber 1, the piston is placed within the said chamber in engagement with the top 40 of the package, and the cover 2 is forced down and attached to the chamber 1 by means of the pin and bayonet slot connection 3, it being understood that when thus assembled, the spring 14 will be materially compressed. As the spring moves the piston downwardly, it will force the top 40 downwardly to force the plastic or viscous material from the package and into the dispensing chamber 8, the top 40 thus serving the dual function of a closure and a piston or "follower". When the contents of the package 38 have been consumed, i. e., when the piston 15 has forced the top 40 to the bottom of the package, the top 2, spring 14 and piston 15 are removed from the chamber 1, the empty package 38 is withdrawn, and a filled package 38 is then inserted within the chamber 1 and the parts assembled as above described. It is believed that the operation of this form of my invention will be readily understood from the above explanation of the operation of that form of my invention shown in Figs. 1 to 4 inclusive, it being noted that the member 23, links 27, 35 and 36, shaft 29, handle 31, etc., are constructed the same and operate the same in both forms of my invention presented herein.

It will thus be seen that I have provided a relatively simple and efficient dispensing device comprising as its important and essential parts, a supply chamber or reservoir 1, a dispensing or "pressure" chamber 8, a means for forcing the material to be dispensed from the supply chamber into the dispensing chamber, and a pair of simultaneously operable valves, one controlling the passage of material from the supply chamber to the dispensing chamber and the other controlling the flow of material from the dispensing chamber, the first mentioned valve also functioning as a piston or plunger to forcibly eject the material from the dispensing chamber. Since the outlet valve from the dispensing chamber is positively moved to closed position, the material discharged from the dispensing chamber is cut or sheared off, thus avoiding the dripping of the material from the outlet opening and the accumulation of material on the outside of the device near the outlet opening thereof.

It is to be understood that the forms of my invention shown and described herein are to be taken as preferred embodiments of the same and that various changes may be made in the size, shape, and arrangement of parts without departing from the spirit of my invention or the scope of the subjoined claims.

Having thus described my invention, what I claim as new and desire to secure by Letters Patent is:

1. A dispensing device comprising an elongated supply chamber, a dispensing chamber communicating therewith and having an inlet and an outlet opening, said dispensing chamber and its inlet and outlet openings being disposed in alignment with the axis of said supply chamber, means for forcing the contents of said supply chamber into said dispensing chamber through the inlet opening thereof, and a combined valve and piston axially movable with respect to the axis of the supply chamber for controlling said inlet opening and for forcibly ejecting a portion of the contents of said dispensing chamber through the outlet opening thereof.

2. A dispensing device comprising an elongated supply chamber, a dispensing chamber communicating therewith and having an inlet and an outlet opening, said dispensing chamber and its inlet and outlet openings being disposed in alignment with the axis of said supply chamber, means for forcing the contents of said supply chamber into said dispensing chamber through the inlet opening thereof, a combined valve and piston axially movable with respect to the axis of the supply chamber for controlling said inlet opening and for forcibly ejecting a portion of the contents of said dispensing chamber through the outlet opening thereof, and a valve axially movable with respect to the axis of the supply chamber for controlling said outlet opening.

3. A dispensing device comprising an elongated supply chamber, an elongated dispensing chamber communicating therewith and having an inlet and an outlet opening, said dispensing chamber and the inlet and outlet openings thereof being disposed in alignment with the axis of said supply chamber, means for forcing the contents of said supply chamber into said dispensing chamber through the inlet opening thereof, a combined valve and piston axially movable with respect to the axis of said supply chamber for controlling said inlet opening and for forcibly ejecting a portion of the contents of said dispensing chamber through the outlet opening thereof, a valve axially movable with respect to the axis of said supply chamber for controlling said outlet opening, and means for simultaneously operating said combined valve and piston and said valve.

4. A dispensing device comprising an elongated supply chamber; an elongated dispensing chamber communicating therewith through an elongated passage forming an inlet for said dispensing chamber, said dispensing chamber having an outlet for the discharge of material therefrom, said dispensing chamber, elongated passage, and said outlet from the dispensing chamber being in alignment with the axis of said supply chamber; means for forcing the material from said supply chamber through said elongated passage and into said dispensing chamber; a combined valve and piston reciprocable within said elongated passage in a direction along the axis of said supply chamber for controlling the flow of material from said supply chamber into said dispensing chamber and for forcibly ejecting a portion of the material from said dispensing chamber through the outlet opening thereof; and means for reciprocating said combined valve and piston within said elongated passage.

5. A dispensing device comprising an elongated supply chamber; an elongated dispensing chamber communicating therewith through an elongated passage forming an inlet for said dispensing chamber, said dispensing chamber having an outlet for the discharge of material therefrom, said dispensing chamber, elongated passage, and said outlet from said dispensing chamber being in alignment with the axis of said supply chamber; means for forcing the material from said supply chamber through said elongated passage and into said dispensing chamber; a combined valve and piston operable within said elongated passage in a direction along the axis of said supply chamber for controlling the flow of material from said supply chamber into said dispensing chamber and for forcibly ejecting a portion of the material from said dispensing chamber through the outlet opening thereof; a valve axially movable with respect to the axis of said supply chamber for controlling the outlet opening of said dispensing chamber; and means for simultaneously operating said combined valve and piston and said valve.

6. A dispensing device comprising a supply chamber; a dispensing chamber communicating therewith and having axially aligned inlet and an outlet opening; a rotatable shaft extending into said dispensing chamber and disposed between said inlet and outlet openings, said shaft provided with an operating handle; means for forcing the contents of said supply chamber into said dispensing chamber through the inlet opening thereof; a combined valve and piston movable axially with respect to the axis passing through said inlet and outlet openings for controlling said inlet opening and for forcibly ejecting a portion of the contents of said dispensing chamber through the outlet opening thereof; and a connection between said combined valve and piston and said rotatable shaft, whereby rotation of said shaft by its operating handle will operate said combined valve and piston to move the same axially with respect to the axis passing through said inlet and outlet openings.

7. A dispensing device comprising a supply chamber; a dispensing chamber communicating therewith and having axially-aligned inlet and an outlet opening; a rotatable shaft extending into said dispensing chamber and disposed between said inlet and outlet openings, said shaft provided with an operating handle; means for forcing the contents of said supply chamber into said dispensing chamber through the inlet opening thereof; a combined valve and piston movable axially with respect to the axis passing through said inlet and outlet openings for controlling said inlet opening and for forcibly ejecting a portion of the contents of said dispensing chamber through the outlet opening thereof; a valve movable axially with respect to the axis passing through said inlet and outlet openings for controlling the outlet opening from said dispensing chamber; a connection between said combined valve and piston and said shaft; and a connection between said valve and said shaft, whereby rotation of said shaft by its operating handle will effect simultaneous operation of said combined valve and piston and said valve in opposite directions along the axis passing through said inlet and outlet openings.

8. A dispensing device comprising a supply chamber; a dispensing chamber communicating therewith and having an inlet and an outlet opening; a rotatable shaft extending into said dispensing chamber and provided with an operating handle; a link on said shaft and rotatable therewith; means for forcing the contents of said supply chamber into said dispensing chamber through the inlet opening thereof; a combined valve and piston for controlling said inlet opening and for forcibly ejecting a portion of the contents of said dispensing chamber through the outlet opening thereof; and a link extending between the link on the shaft and said combined valve and piston, whereby rotation of said shaft by its operating handle will operate said combined valve and piston.

9. A dispensing device comprising a supply chamber; a dispensing chamber communicating therewith and having an inlet and an outlet opening; a rotatable shaft extending into said dispensing chamber and provided with an operating handle; a link on said shaft extending on opposite sides of said shaft and rotatable therewith; means for forcing the contents of said supply chamber into said dispensing chamber through the inlet opening thereof; a combined valve and piston for controlling said inlet opening and for forcibly ejecting a portion of the contents of said dispensing chamber through the outlet opening thereof; a valve for controlling the outlet opening from said dispensing chamber; a link extending between said combined valve and piston and one end of the link on said shaft; and a link extending between said valve and the other end of the link on said shaft, whereby rotation of said shaft by its operating handle will effect simultaneous operation of said combined valve and piston and said valve.

10. A dispensing device comprising a supply chamber; a dispensing chamber communicating therewith through an elongated passage forming an inlet for said dispensing chamber, said dispensing chamber having an outlet for the discharge of material therefrom; means for forcing the material from said supply chamber through said elongated passage and into said dispensing chamber; a combined valve and piston operable within said elongated passage, said combined valve and piston comprising a hollow member having a radial opening extending through its side wall near the upper, closed end thereof and said member being reciprocable within said elongated passage; and means for moving said combined valve and piston within said passage to either position the radial opening therein above an end of said passage so that the material may be forced from the supply chamber, through said opening, through the hollow combined valve and piston and into the dispensing chamber or to position the radial opening therein below an end of said passage to cut off communication between said supply and dispensing chambers and to forcibly eject a portion of the material from the dispensing chamber through the outlet opening thereof.

11. A dispensing device comprising a supply chamber, a dispensing chamber communicating therewith through an elongated, cylindrical passage forming an inlet for said dispensing chamber; said dispensing chamber having an outlet for the discharge of material therefrom; means for forcing the material from said supply chamber through said elongated passage and into said dispensing chamber; a combined valve and piston operable within said elongated passage, said combined valve and piston comprising a hollow cylindrical member having a radial opening extending through its side wall near the upper, closed end thereof and said member being reciprocable within said elongated passage; means for moving said combined valve and piston within said passage to position the radial opening therein below an end of said passage to cut off communication between said supply and dispensing chambers and to forcibly eject a portion of the material from the dispensing chamber through the outlet opening thereof; and means for normally retaining the combined valve and piston with the said radial opening communicating with the supply chamber so that the material may be forced from the supply chamber, through said opening, through the hollow combined valve and piston and into the dispensing chamber.

FLOYD E. GRAHAM.